(No Model.) 5 Sheets—Sheet 1.

H. B. SMITH.
MAGNETIC ORE SEPARATOR.

No. 430,758. Patented June 24, 1890.

WITNESSES:

INVENTOR
Harris B. Smith
BY ATT'Y (No Model.) 5 Sheets—Sheet 2.

H. B. SMITH.
MAGNETIC ORE SEPARATOR.

No. 430,758. Patented June 24, 1890.

WITNESSES:

INVENTOR
Harris B. Smith
BY ATT'Y (No Model.)
H. B. SMITH
MAGNETIC ORE SEPARATOR.
No. 430,758.
5 Sheets—Sheet 3.
Patented June 24, 1890.
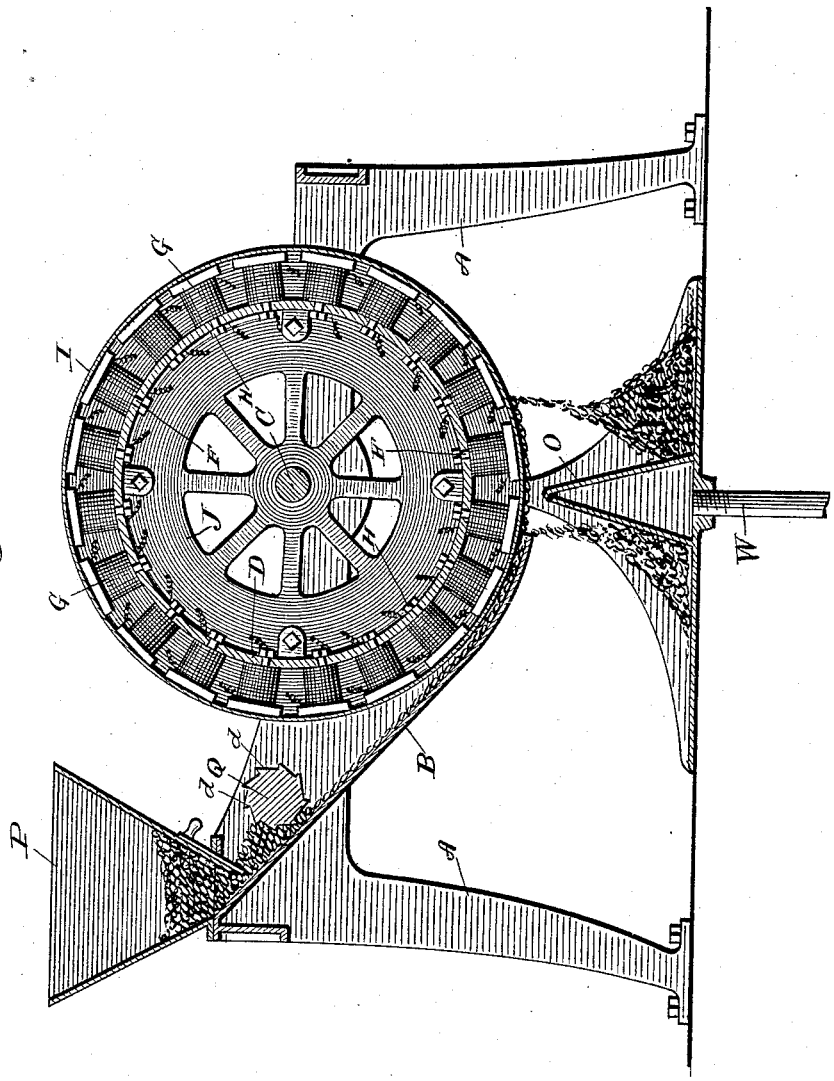
WITNESSES:
INVENTOR
Harris B. Smith
BY ATT'Y (No Model.) 5 Sheets—Sheet 4.
H. B. SMITH.
MAGNETIC ORE SEPARATOR.
No. 430,758. Patented June 24, 1890.
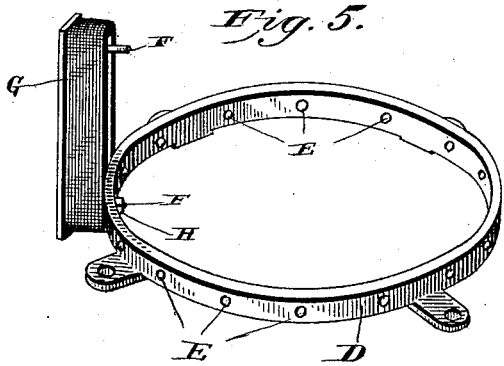
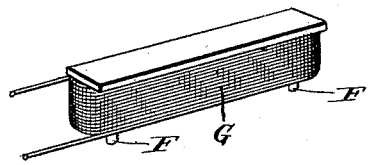
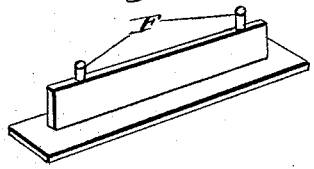
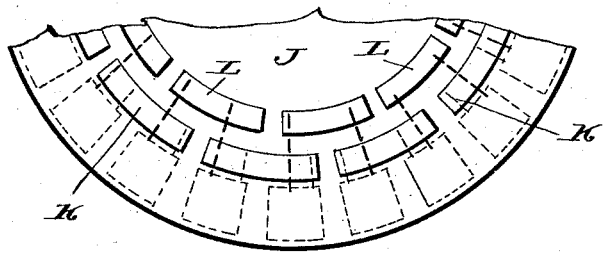
WITNESSES:
INVENTOR
Harris B. Smith
BY F. W. Smith ATT'Y (No Model.)　　　　　　　　H. B. SMITH.　　　　5 Sheets—Sheet 5.
MAGNETIC ORE SEPARATOR.

No. 430,758.　　　　　　　　　　　Patented June 24, 1890.

WITNESSES:

INVENTOR
Harris B. Smith
BY　　　ATT'Y

UNITED STATES PATENT OFFICE.

HARRIS B. SMITH, OF BRIDGEPORT, CONNECTICUT.

MAGNETIC ORE-SEPARATOR.

SPECIFICATION forming part of Letters Patent No. 430,758, dated June 24, 1890.

Application filed October 23, 1889. Serial No. 327,967. (No model.)

*To all whom it may concern:*

Be it known that I, HARRIS B. SMITH, a citizen of the United States, residing at Bridgeport, in the county of Fairfield and State of Connecticut, have invented certain new and useful Improvements in Magnetic Ore-Separators; and I do hereby declare the following to be a full, clear, and exact description of the invention, such as will enable others skilled in the art to which it appertains to make and use the same.

My invention relates to magnetic ore-separators; and it has for its object, first, to insure the free and uninterrupted feeding of the ore; and, second, to provide a machine of this description which shall have great capacity, while at the same time the effectiveness of said machine shall be unsurpassed.

With these ends in view my invention consists in the details of construction and combination of elements, such as will be fully hereinafter set forth, and then specifically designated by the claims.

Figure 1:
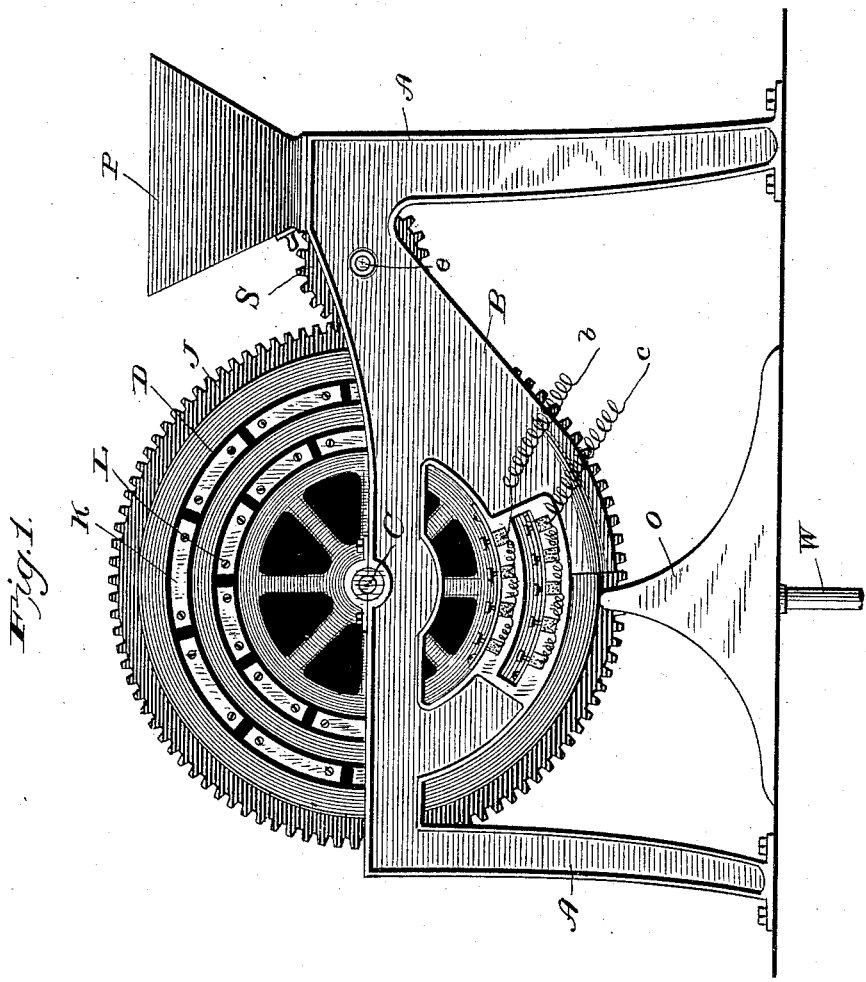
Figure 2:
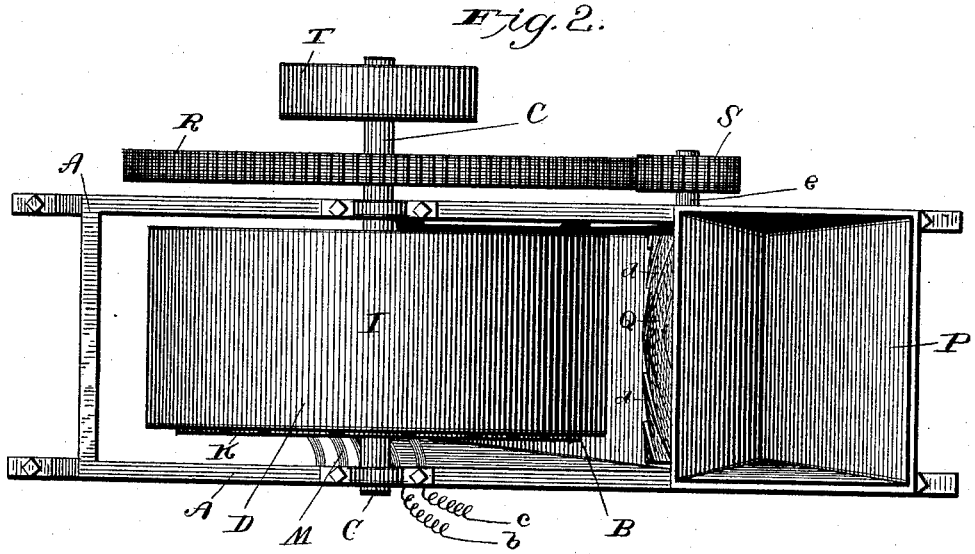
Figure 3:
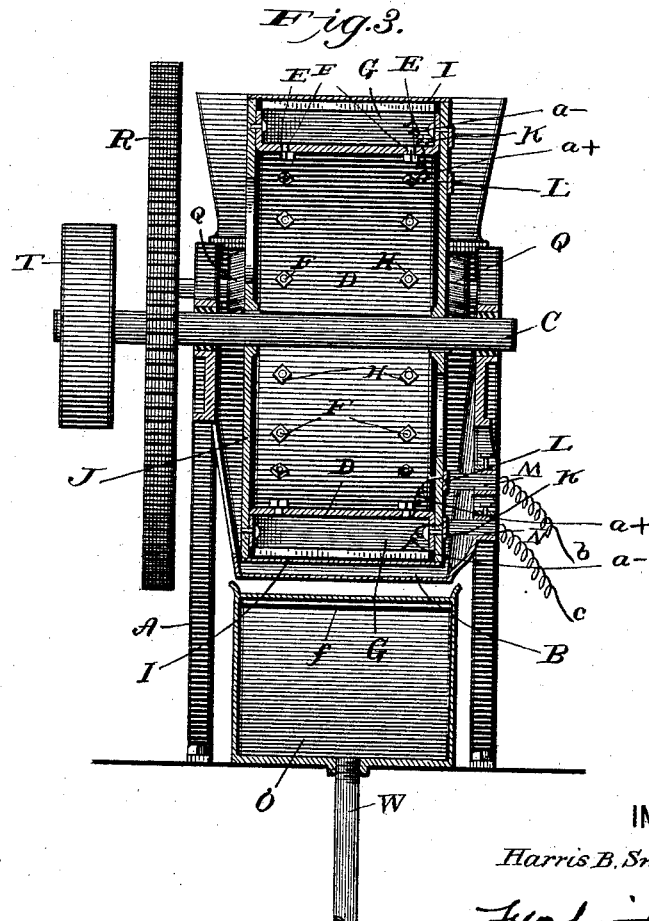
Figure 9:
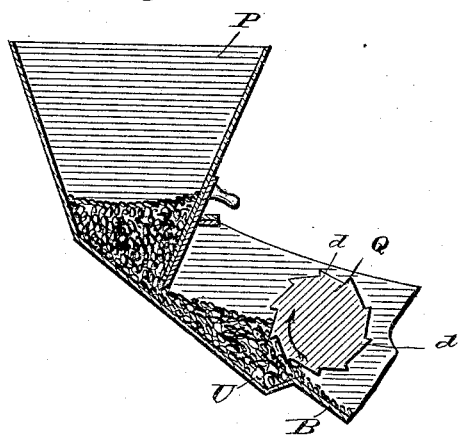
Figure 10:
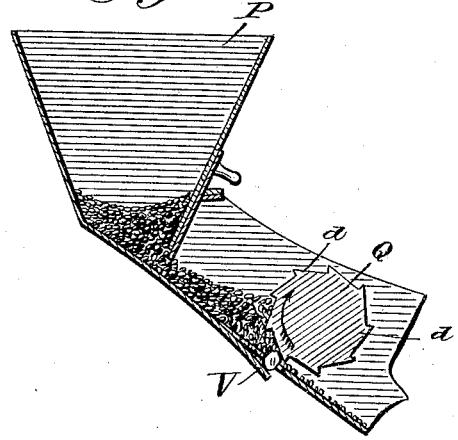
Figure 11:
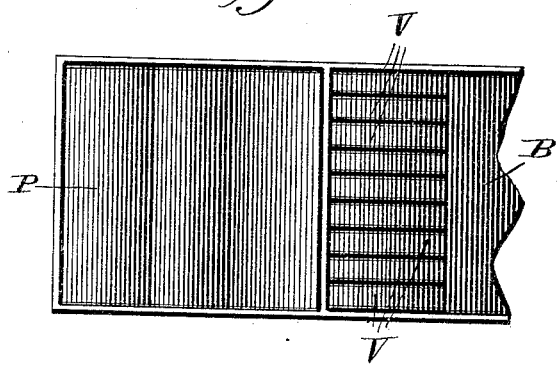
Figure 12:
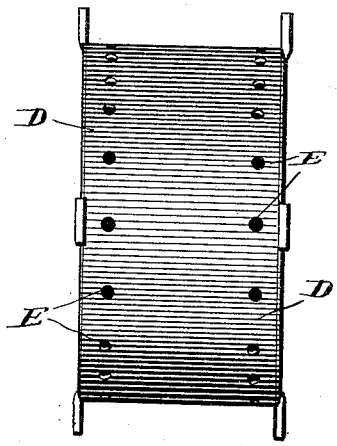

In the accompanying drawings, Figure 1 is a side elevation of my improved separator; Fig. 2, a plan view; Fig. 3, a cross vertical section; Fig. 4, a longitudinal vertical section; Fig. 5, a detail view showing the manner in which the magnets are secured to the drum. Figs. 6 and 7 are details of the magnet wound and unwound, respectively; Fig. 8, a detail broken-away diagram showing the connections between the magnets and the contact-plates. Figs. 9 and 10 are broken-away sectional elevations illustrating two modified forms of chute especially of advantage when large pieces of ore or foreign material come in contact with the spreader; Fig. 11, a plan of the chute shown at Fig. 10, and Fig. 12 an elevation showing my preferred form of drum which carries the magnets.

Similar letters denote like parts in the several figures of the drawings.

A is a frame or stand, the bottom of which is shaped into an inclined chute B. Within the sides of this frame is journaled the shaft C of a hollow drum D. The periphery of the drum is provided with holes E, through which extend the legs F of the magnets G, the legs being secured by nuts H on the inside of the drum, as seen at Fig. 5. These magnets extend throughout the entire circumference of the drum, and are alternately of opposite polarity, so that, taken in connection with the drum, they form in adjacent pairs horseshoe-magnets. Around the faces of the magnets is an exterior casing I, of zinc, sheet-brass, or any other non-magnetic material, whose function is to protect the magnets, and also to prevent dirt or other foreign matter from rotting or damaging the insulation of the magnet-helices.

J are cheek-pieces secured to the sides of the drum within the casing I.

K L are insulated contact-plates secured to the side face of one of the pieces J in circles concentric with the shaft C. One of these circles is of greater diameter than the other, so that the plates K are separated from the plates L for the purpose presently explained. The magnet-wires $a+$ and $a-$ are led out through the side piece J and are connected, respectively, with the plates L K, as seen at Figs. 3 and 8, so that it will be readily understood that the positive wires are all in contact with one series of plates, while the negative wires are in contact with the other series of plates, thus establishing a complete circuit throughout all the magnets.

M N are two series of brushes secured within the frame A and insulated therefrom. These brushes are so arranged that they are respectively opposite to the plates L K and are always in contact therewith. Both series of brushes are connected in circuit, and the wires $b\ c$ from any suitable dynamo are connected to said series. As the drum revolves, the various magnets will successively come in the circuit with the brushes and are charged, so that a continuous and stationary magnetic field will become established. Of course the magnetic field may be lengthened or shortened by simply increasing or decreasing the number and extent of the brushes; or the location of said field may obviously be changed, if desired, and I do not wish to be limited in these respects.

The inclined chute B at its lower end leads for a distance into close proximity to the casing I and ends in the immediate rear of a partition O. The magnetic field extends above said partition and on both sides thereof, so that the non-magnetic particles may fall by gravity at the rear of the partition, while the magnetic particles are carried through the extent of the said field until they pass beyond the latter and said partition, when they also drop by gravity.

P is any suitable hopper at the top of the chute, and Q is what I term a "spreader." This spreader is simply a cylinder with ratchet-shaped lags $d$ on its circumference, said lags adapted to revolve in a plane sufficiently close to the chute to permit a uniform number of particles to pass underneath the same to the magnetic field.

R S are intermeshing cogs, secured, respectively, on the shafts C of the drum and $e$ of the spreader, and T is the power-pulley on the end of the shaft C.

Motion being communicated to the spreader in the direction indicated by the arrow, the mass of ore and foreign particles are pushed backward, so as to allow only a certain amount to pass down the chute beneath the spreader. The lags $d$ distribute and spread the ore and foreign particles evenly throughout the width of the chute, and thereby prevent any clogging. As a precaution against the clogging of the flow of ore by extraordinary large lumps of the latter, I prefer to form a series of spring-fingers V in the floor of the chute, as shown at Fig. 11, so that the action of the spreader against said pieces will force the fingers down, as shown at Fig. 10, and thereby permit them to drop free of the fingers and out of the chute, or else be thrown by the resilient action of the fingers down the chute and clear of the spreader. Of course these spring-fingers may be of any number from one upward, the gist of my invention in this respect resting in the broad idea of a yielding floor immediately beneath the spreader. At Fig. 10 I have shown a modified way of providing for these large lumps of ore by forming a sink U in the floor of the chute in the immediate rear of the spreader; but I prefer the construction shown at Fig. 11. A pipe W is provided, leading within the partition O, by means of which a stream of water may be introduced through the orifice $f$ to wash the ore, if desired.

Of course it is immaterial where the ore is primarily fed, as long as it eventually comes within the influence of the magnetic field, and therefore the hopper may be located immediately over the drum, if found desirable.

Having thus fully described my invention, what I claim, and desire to secure by Letters Patent, is—

1. In combination with the hopper and chute, a spreader adapted to revolve against the flow of ore and provided with ratchet-shaped lags, substantially as shown and set forth.

2. The combination of the drum, the magnets secured thereto, the non-magnetic casing around the circumference of said drum immediately outside of the magnets, the cheek-pieces secured to the sides of the drum, the concentric and separate series of contact-plates secured to one of said pieces and insulated therefrom, each series being in electrical contact with the respective positive and negative electrodes of the helices of the magnets, and the two insulated series of brushes, respectively opposite to the two series of contact-plates and secured to any stationary part of the machine, substantially as shown and described.

3. In a magnetic ore-separator, a means for washing the ore, consisting of a partition O, a pipe W, leading within said partition, the latter having an orifice $f$ at the top immediately beneath the magnetic field, substantially as set forth.

In testimony whereof I affix my signature in presence of two witnesses.

HARRIS B. SMITH.

Witnesses:
F. W. SMITH, Jr.,
J. P. FINCH.